United States Patent [19]

Shuck

[11] 4,057,780
[45] Nov. 8, 1977

[54] METHOD FOR DESCRIBING FRACTURES IN SUBTERRANEAN EARTH FORMATIONS

[75] Inventor: Lowell Z. Shuck, Morgantown, W. Va.

[73] Assignee: The United States of America as represented by the United States Energy Research and Development Administration, Washington, D.C.

[21] Appl. No.: 668,346

[22] Filed: Mar. 19, 1976

[51] Int. Cl.² .................. G01V 1/02; G01V 1/28
[52] U.S. Cl. .................. 340/15.5 MC; 181/106; 181/116; 175/1; 175/2; 175/40; 166/305 R
[58] Field of Search ............. 340/15.5 MC; 181/106, 181/116, 402, 401; 175/1, 2, 40, 50; 166/253, 250, 305 R; 102/20, 22

[56] References Cited

U.S. PATENT DOCUMENTS

| | | | |
|---|---|---|---|
| 2,867,172 | 1/1959 | Hradel | 102/20 |
| 3,702,635 | 11/1972 | Farr | 181/116 |
| 3,718,088 | 2/1973 | Bearden et al. | 181/106 |
| 3,739,871 | 6/1973 | Bailey | 175/1 |
| 3,817,345 | 6/1974 | Bailey | 340/15.5 MC |
| 3,856,095 | 12/1974 | Adair et al. | 175/1 |
| 3,949,353 | 4/1976 | Waters et al. | 340/15.5 MC |
| 4,005,750 | 2/1977 | Shuck | 166/250 |
| 4,026,382 | 5/1977 | Field et al. | 175/50 |

Primary Examiner—Howard A. Birmiel
Attorney, Agent, or Firm—Dean E. Carlson; Stephen D. Hamel; Earl L. Larcher

[57] ABSTRACT

The configuration and directional orientation of natural or induced fractures in subterranean earth formations are described by introducing a liquid explosive into the fracture, detonating the explosive, and then monitoring the resulting acoustic emissions with strategically placed acoustic sensors as the explosion propagates through the fracture at a known rate.

4 Claims, 3 Drawing Figures

METHOD FOR DESCRIBING FRACTURES IN SUBTERRANEAN EARTH FORMATIONS

The present invention relates generally to mapping fracture systems in subterranean earth formations, and more particularly to such mapping wherein acoustic emissions emanating from a liquid explosive detonating at a known rate within the fracture are monitored at various locations for describing the fracture.

Monitoring various subterranean noises, such as seismic and acoustic emission, in oil, gas, geothermal, and other sub-surface formations has been previously used for the purpose of gathering knowledge of the certain characteristics in the sub-surface formation, such as anomalies, permeabilities, fractures, and other natural or man-made conditions. This monitoring is usually made with the objectives such as production enhancement, exploration, and the determination of the elastic properties of the reservoir formation. Perhaps one of the more important applications envisioned in monitoring sub-surface acoustic emission is the monitoring of hydraulic fracturing processes by strategically placing suitable acoustic sensors and then monitoring the emissions emanating from a hydraulic fracture through the sub-surface earth formation so as to enable the induced fracture to be mapped in time and space as it is occurring. This technique provides a ready mechanism for evaluating the hydraulic fracturing operation as well as providing a mechanism for indicating the direction and characteristics of the fracture as it is induced and for identifying the geometrical distribution shape and sizes of other natural fracture systems in earth formations including geological faults.

While the aforementioned technique is useful for describing fractures from wellbores as they occur, there is not believed to be any mechanism or technique for describing the configuration and directional orientation of natural or previously induced hydraulic fractures in subterranean earth formations. Accordingly, it is the primary goal or aim of the present invention to provide a method for mapping the natural and induced fractures in such formations so as to provide the description of the fracture systems for facilitating production and future sub-surface exploration. The method of the present invention utilized for describing the subterranean fracture systems comprises the steps wherein a liquid explosive is pumped through a wellbore and into the fractures emanating therefrom. The explosive is then detonated to explode at a preselected and controlled rate through the fracture system. As this controlled explosion propagates through the fracture, the acoustic emissions emanating therefrom are received at strategically placed acoustic sensors and directed to an analyzing system for describing the fracture.

Other and further objects of the invention will be obvious upon an understanding of the illustrative method about to be described, or will be indicated in the appended claims, and various advantages not referred to herein will occur to one skilled in the art upon employment of the invention in practice.

An embodiment of the invention has been chosen for the purpose of illustration and description. The embodiment illustrated is not intended to be exhaustive or to limit the invention to the precise arrangement disclosed. It is chosen and described in order to best explain the method of the invention and its application in practical use to thereby enable others skilled in the art to best utilize the invention in various modifications as are best adapted to the particular use contemplated.

Figure 1:
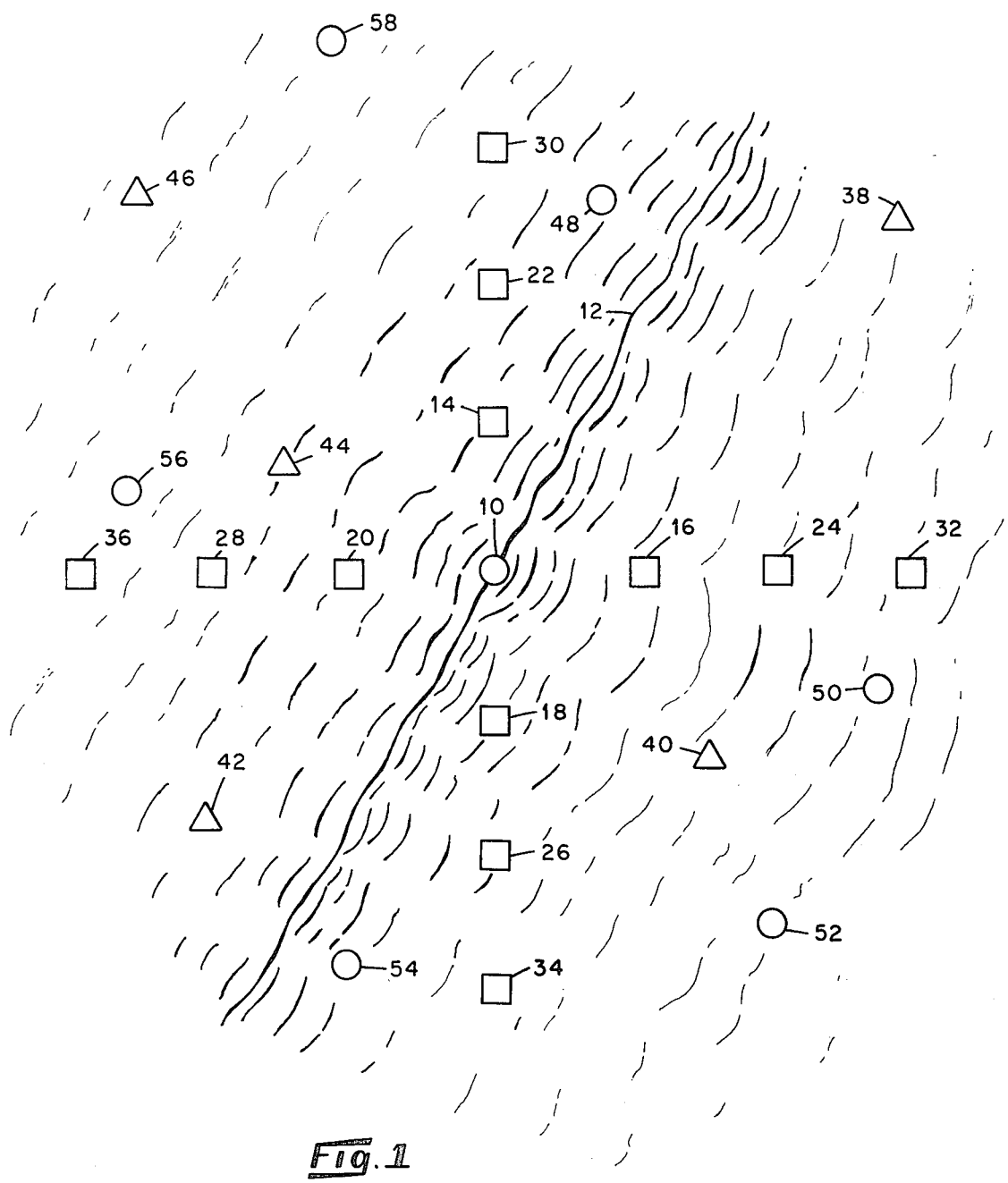
FIG. 1 is a highly schematic plan view showing a wellbore penetrating an earth formation which has a sub-surface fracture emanating from the wellbore and acoustic sensors in positions which may be utilized for mapping the fracture in accordance with the method of the present invention.

Generally, the method of the present invention is directed to describing or mapping the configuration and directional orientation of natural or induced fractures in subterranean earth formations. This method may be practiced by surrounding a wellbore from which the fracture emanates with a plurality of acoustic sensors which may be disposed at selected surface locations, as well as at locations penetrating the sub-surface earth formation. A liquid explosive capable of burning or exploding at a selected controlled rate is pumped into the fracture through the wellbore and then detonated. As this detonation of the liquid explosive occurs and the burn front thereof propagates from the wellbore toward the tips of the fracture, acoustic signals are generated and transmitted through the surrounding earth formation. These acoustic signals are, in turn, received by the acoustic sensors and transmitted to a suitable data analyzing system. Th configuration and orientation of the fracture may then be readily determined by the characteristics of the signals relative to the particular sensors picking up the signal. These signal characteristics include amplitude, phase and wave formations, and rise times of the signals.

The liquid explosive employed in the practice of the present invention may be any suitable commercially available explosive which may be introduced into a wellbore under pressure and which is of a viscosity which will allow it to flow into fracture portions as small as .15 mil wide which is necessary to ensure that the explosive will contact essentially the full fracture. For example, satisfactory commercially available liquid explosives are manufactured by the Teledyne McCormick Selph Corporation, Hollister, California, under the trademarks "Teledet" and "Hivolite." These liquid explosives may be diluted by well-known techniques to burn or explode at a rate on the order of about 100–3000 meters/second, which is sufficient to provide adequate acoustical energy to allow for the recording thereof at substantial distances from the fracture system. The relatively slow burn rates are desirable because they provide longer time durations at a given point or fracture zone which allows longer record lengths for data enhancement using stochastic process, time series methods of data analysis. The detonation of the liquid explosive may be achieved in any suitable manner, such as electrical, blasting caps, or any other well-known technique.

The acoustic signals given off from the detonating liquid explosive that are used in the practice of the present invention are high frequency or rise time compressive stress waves which are transmitted through geological formations simultaneously as dilatational (P-waves) and deviatoric or shear (S-waves) waves with amplitude and phase characteristics being functions of the media and distances from the acoustic source (in this case the liquid explosive). The P and S waves propagate at approximately 6,000 m/sec and 4,000 m/sec, respectively.

The acoustical sensors employed for practicing the method of the present invention are preferably hydrophone transducers, such as commonly used for underwater noise monitoring but other sensors, such as accelerometers and higher frequency geophones used for earthquake monitoring may also be suitably employed. The operating characteristics of the hydrophones and other acoustic sensors used in the method of the present invention should have operating characteristics which enable satisfactory reception of acoustic emissions at surface and sub-surface locations. For example, satisfactory results may be achieved with transducers having operating characteristics in the range of −150 to −170 db gain (relative to 1 μPa) and relatively flat frequency response over the range of 2 Hz to 5,000 Hz.

Figure 2:
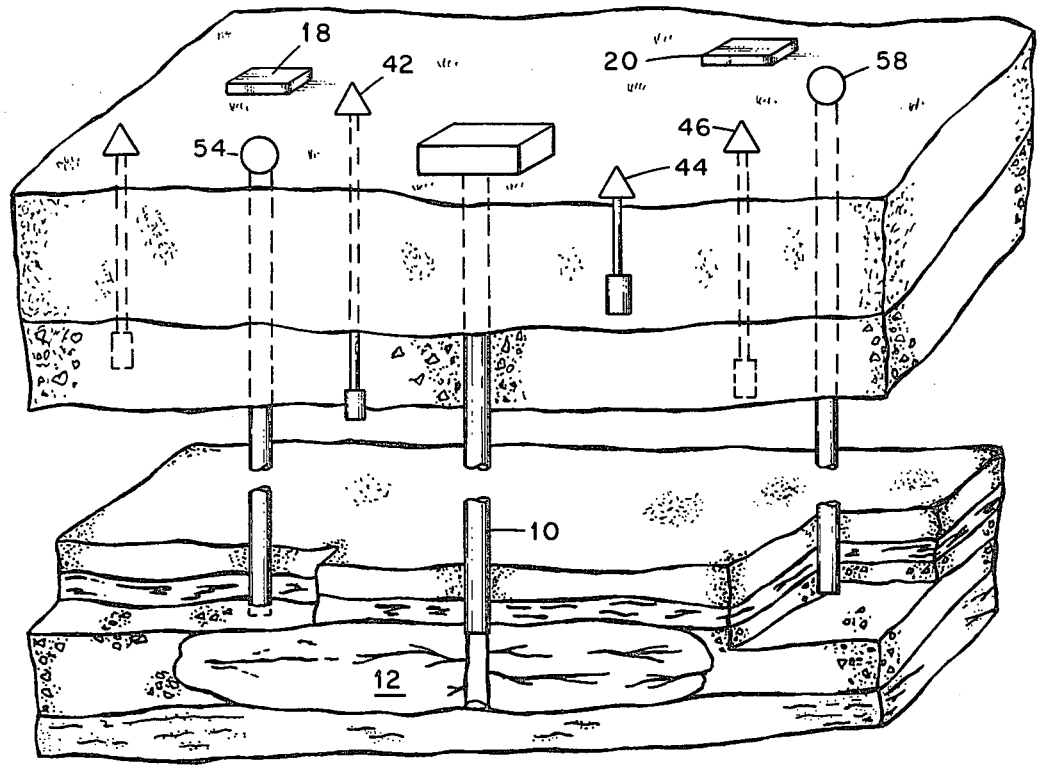
FIG. 2 is a schematic perspective view showing typical placement of acoustic sensors which may be utilized for mapping the fracture in the sub-surface earth formation.

As shown in FIGS. 1 and 2, a plurality of acoustic sensors are emplaced in each quadrant about the wellbore 10 from which extends a fracture 12 of unknown orientation and configuration so as to ensure an accurate reading of the fracture characteristics. Satisfactory reception of the acoustic emission may be achieved by employing surface sensors alone or with sensors disposed at locations approximately 25 to 50 feet below the surface so as to assure minimal interference with surface noise. Also, it is desirable, if possible, to place sensors in nearby wellbores which penetrate the geological formation through which the fracture extends. The surface sensors 14–36 are preferably disposed about the wellbore at selected and increasing distances therefrom with a suitable number of these surface sensors disposed in each quadrant at spaced-apart locations so as to ensure an accurate monitoring of the fracture irrespective of its orientation. As shown in FIG. 1, three surface sensors are disposed in each quadrant with sensors 14, 16, 18, and 20 being disposed 90° apart from one another at locations preferably uniformly spaced from the wellbore 10. Sensors 22 through 36 are disposed at equally spaced distances from the wellbore in alignment with the initially placed sensors but at greater distances from the wellbore 10. The particular spacings of the surface sensors from the wellbore and each other are preferably relative to the depth of the sub-surface earth formation being mapped. For example, satisfactory results may be achieved by placing the first set of sensors 14–20 at locations equal to about one-half of the depth of the sub-surface earth formation, the second set of sensors 22–28 at locations equal to about the depth of earth formation, and the third set of sensors 30–36 at locations equal to about 1½ times the depth of earth formation. Other configurations may be used to optimize various phases of source location involving, for example, computer solution of equations and particular geological formations.

As mentioned above, it is preferable to locate sensors at intermediate locations so as to minimize the effects of surface noise due to hydraulic pumping, equipment operations, earth movement, etc. These sensors 38–46 may be satisfactorily emplaced by drilling relatively shallow holes in the order of about 25 to 50 feet in depth. These intermediate depth sensors may be placed at any strategic location where drilling may be satisfactorily achieved, and preferably within a radius from the wellbore where the fracture is expected to terminate. In addition to the surface sensors and intermediate sensors, it is preferable to locate sensors in wellbores penetrating the earth formation being mapped. These sensors 48–58 are shown in wellbores which are normally used for recovery purposes and are usually disposed within the earth formation at random locations.

Figure 3:
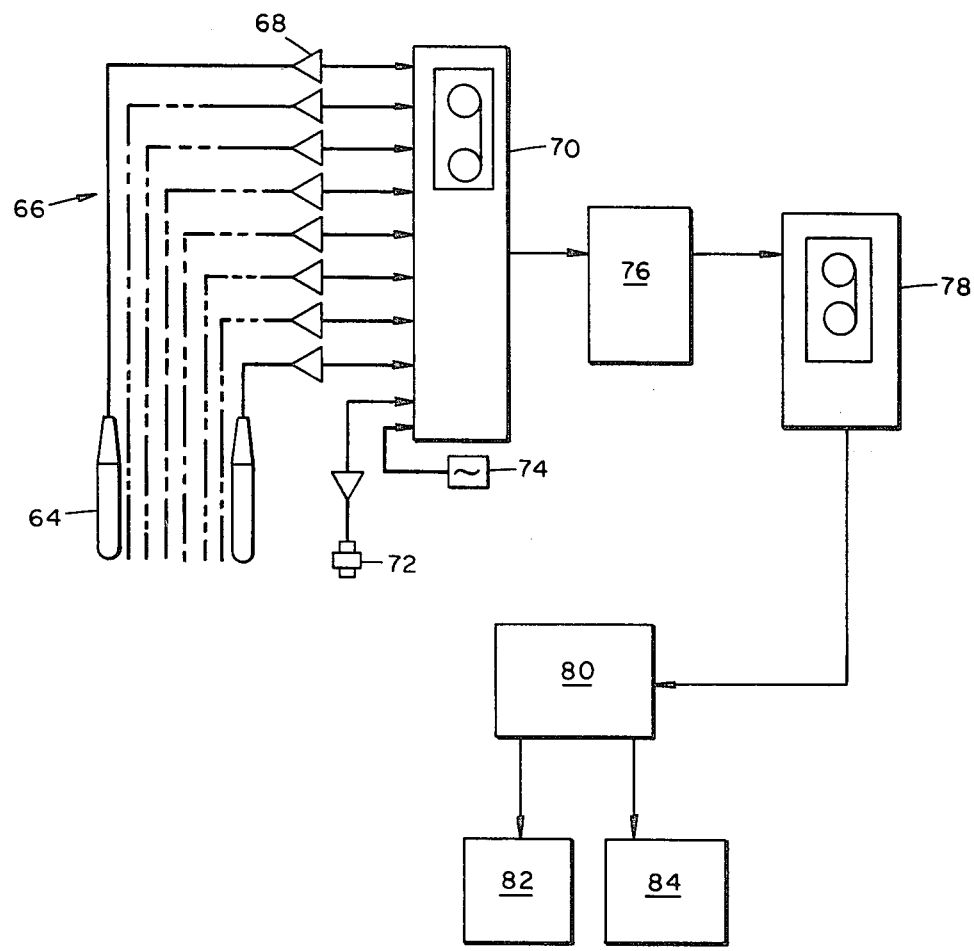
FIG. 3 is a schematic block diagram showing a data-analyzing system of the type which may be used for analyzing the acoustic emissions received from the acoustic sensors emplaced about the fracture system being mapped.

As shown in FIG. 3, the acoustic emissions once received by the acoustic sensors are transmitted to a data acquisition system which may be of any suitable commercially available type capable of receiving and analyzing the signals from the sensors so as to provide the desired monitoring of the fracture system. For example, as shown in FIG. 3, the acoustic emissions received by hydrophones 64 may be transmitted through suitable shielded cables 66 and amplifiers 68 into a FM magnetic tape recorder 70 having a suitable number of channels therein for recording the acoustic emissions received by each hydrophone 64. A timing signal indicative of the initial detonation of the liquid explosive, such as shown by the indicator at 72, is also introduced into the recorder 70 to initiate the operation thereof so that the travel time of the seismic emission from the wellbore to the hydrophones may be recorded and utilized for fracture mapping purposes. It is also desirable to record the wellbore pressure since it is known that the pressure will affect the velocity of the acoustic emission and, since the pressure transients are useful as reference signals in reducing and correlating the acoustic data. This pressure sensing may be provided by using any conventional pressure sensor, such as a strain gage type as generally shown at 74. The taped data from the recorder 70 may then be analyzed in any suitable manner, such as by running it through an analog-to-digital converter 76 and into a storage recorder 78 or into a suitable digital computer 88 for assaying the raw data, analyzing the signals and substituting these data into equations which are then solved to yield the source locations. This data may then be reproduced as a plot 82 or printout 84 indicative of the fracture characteristics.

In a typical operation the orientation and configuration of the fracture 12 may be mapped by filling the fracture 12 with the liquid explosive and electrically detonating the explosive. The acoustic emissions resulting from the detonation are initially transmitted to the sensors 14 through 20 disposed nearest the wellbore. The amplitude of the acoustic emissions received by sensors 14 and 18 would be greater for the particular orientation of the fracture shown than that received by sensors 16 and 20 so as to indicate that the fracture 12 is extending from the wellbore 10 in a direction nearer the sensors 14 and 18. This difference in signal amplitude between that received by sensors 14 and 16 and 18 and 20 will provide additional information for determining the exact position of the fracture orientation emanating from the wellbore. The acoustic sources can be located within a radius of approximately 5 feet under typical reservoir conditions. As the explosion propagates along the length of the fracture from the wellbore 10 to the tip of the fracture 12 differences in signal amplitudes and phases received by the various sensors positioned further away from the wellbore also helps delineate the directional properties of the fracture. Also, the size of the fracture cavity is approximately determined by the amplitude of the acoustic signal which depend upon volumes of explosive in the fracture so as to further facilitate the mapping of the fracture so as to further facilitate the mapping of the fracture.

It will be seen that the present invention provides a novel technique for accurately describing the characteristics of natural and induced fractures in sub-surface earth formations so as to greatly facilitate further exploration and energy recovery from such earth formations or the safe storage of liquid waste products in other formations.

What is claimed is:

1. A method for describing the configuration and directional orientation of a natural or a previously induced fracture extending from a wellbore penetrating a sub-surface earth formation containing the fracture, comprising the steps of positioning a plurality of acoustic sensors at selected locations about the wellbore, introducing a liquid explosive of a preselected detonation rate in the range of about 100 to 3000 meters per second into the fracture, detonating the liquid explosive at the wellbore to effect propagation of the explosion in the fracture at said selected rate from the wellbore towards the extremities of fracture remote to the wellbore with said detonating explosive producing and transmitting acoustic emission through earth formations surrounding the fracture for reception by said acoustic sensors, and analyzing and comparing the characteristics of the acoustic emission received by each of the plurality of acoustic sensors for effecting the description of the fracture.

2. The method claimed in claim 1, wherein the plurality of acoustic sensors comprise a selected number of sensors disposed on the ground surface with several ground surface sensors in each quadrant disposed at preselected locations.

3. The method claimed in claim 2, wherein said plurality of acoustic sensors include sensors disposed below the ground surface.

4. The method claimed in claim 2, wherein said acoustic sensors are hydrophone transducers characterized by high flat frequency response up to 5,000 Hz and sensitivities greater than − 150 db.

* * * * *